(12) United States Patent
Holte

(10) Patent No.: US 8,271,560 B2
(45) Date of Patent: Sep. 18, 2012

(54) SYSTEM, PROCESS AND SOFTWARE ARRANGEMENT FOR ASSISTING IN NAVIGATING THE INTERNET

(75) Inventor: Bjorn Holte, Trondheim (NO)

(73) Assignee: BMENU AS, Oslo (NO)

( * ) Notice: Subject to any disclaimer, the term of this patent is extended or adjusted under 35 U.S.C. 154(b) by 1843 days.

(21) Appl. No.: 11/364,393

(22) Filed: Feb. 27, 2006

(65) Prior Publication Data

US 2007/0130125 A1 Jun. 7, 2007

(30) Foreign Application Priority Data

Dec. 5, 2005 (NO) .................................. 20056187

(51) Int. Cl.
*G06F 17/30* (2006.01)
(52) U.S. Cl. ........................................................ 707/829
(58) Field of Classification Search .................. 707/829
See application file for complete search history.

(56) References Cited

U.S. PATENT DOCUMENTS

| | | | |
|---|---|---|---|
| 5,463,727 A | 10/1995 | Wiggins et al. | |
| 6,038,610 A | 3/2000 | Belfiore et al. | |
| 6,226,655 B1 | 5/2001 | Borman et al. | |
| 6,256,028 B1 | 7/2001 | Sanford et al. | |
| 6,321,222 B1 | 11/2001 | Söderström et al. | |
| 6,598,042 B1 | 7/2003 | Kienan | |
| 6,633,316 B1 | 10/2003 | Maddalozzo, Jr. et al. | |
| 6,687,704 B1 * | 2/2004 | Russell | 707/100 |
| 6,771,284 B1 | 8/2004 | Anderson et al. | |
| 6,809,724 B1 | 10/2004 | Shiraishi et al. | |
| 6,957,383 B1 | 10/2005 | Smith | |
| 7,228,340 B2 * | 6/2007 | De Boor et al. | 709/217 |
| 7,296,222 B1 | 11/2007 | Sakairi | |
| 2001/0034746 A1 * | 10/2001 | Tsakiris et al. | 707/517 |
| 2002/0019741 A1 * | 2/2002 | Heston | 705/1 |
| 2002/0091455 A1 | 7/2002 | Williams | |
| 2002/0120682 A1 | 8/2002 | Funaki | |
| 2002/0198810 A1 | 12/2002 | Roger | |
| 2003/0126235 A1 * | 7/2003 | Chandrasekar et al. | 709/220 |
| 2004/0027391 A1 | 2/2004 | Tu | |
| 2004/0044747 A1 * | 3/2004 | Trevor et al. | 709/217 |

(Continued)

FOREIGN PATENT DOCUMENTS

WO 2004109557 12/2004

OTHER PUBLICATIONS

Norwegian Patent Office Examination Report for Norwegian Application No. 20056187 and English-language translation thereof.

(Continued)

*Primary Examiner* — Robert Beausoliel, Jr.
*Assistant Examiner* — Noosha Arjomandi
(74) *Attorney, Agent, or Firm* — Dorsey & Whitney LLP

(57) ABSTRACT

A system, method, software arrangement and computer-accessible medium are provided that permit improved access to web pages within a web site via a standardized interface that can be displayed as hierarchal menus. Such menus may be provided by receiving a request to browse a web site, obtaining the link structure and/or content of the web site, and generating menu data reflecting the link structure and/or other properties of the web site. The data may optionally be filtered or truncated to limit the size of the navigational menus.

27 Claims, 16 Drawing Sheets

U.S. PATENT DOCUMENTS

| | | | |
|---|---|---|---|
| 2004/0117349 A1 | 6/2004 | Moricz | |
| 2004/0128275 A1 | 7/2004 | Moehrle | |
| 2004/0205516 A1* | 10/2004 | Tufts | 715/501.1 |
| 2004/0230915 A1 | 11/2004 | Diering et al. | |
| 2004/0268225 A1* | 12/2004 | Walsh et al. | 715/501.1 |
| 2005/0050472 A1 | 3/2005 | Faseler, Jr. et al. | |
| 2005/0065970 A1* | 3/2005 | King et al. | 707/102 |
| 2005/0177784 A1 | 8/2005 | Andrews et al. | |
| 2005/0246627 A1* | 11/2005 | Sayed | 715/513 |
| 2006/0101330 A1 | 5/2006 | Godley | |
| 2007/0022125 A1* | 1/2007 | Salam et al. | 707/100 |
| 2007/0094267 A1* | 4/2007 | Good et al. | 707/10 |

OTHER PUBLICATIONS

International Search Report and Written Opinion dated Oct. 23, 2008 for International Application No. PCT/IB2006/004303.

International Search Report and Written Opinion dated Apr. 20, 2009 for International Application No. PCT/IB2006/004303.

Sakairi, T. "A Site Map for Visualizing Both a Web Site's Structure and Keywords", Systems, Man, and Cybernetics, 1999. IEEE SMC '99 Conference Proceedings. 1999 IEEE International Conference on Tokyo, Japan Oct. 12-15, 1999, Piscataway, NJ, USA, IEEE, US, vol. 4, Oct. 12, 1999, pp. 200-205.

Pilgrim et al. "Designing WWW Site Map Systems", Database and Expert Systems Applications, 1999. Proceedings. Tenth International Workshop on Florence, Italy Sep. 1-3, 1999, Los Alamitos, CA, USA, IEEE Comput. Soc, US, Sep. 1, 1999, pp. 253-258.

Chinese Office Action dated Feb. 1, 2011 for Chinese Patent Application No. 200680052329.6.

Chinese Office Action dated Jun. 7, 2010 for Chinese Patent Application No. 200680052329.6.

* cited by examiner

```
<html>
<body>
<a href="page1.htm">Menu 1</a>
<a href="page2.htm">Menu 2</a>
<a href="page3.htm">Menu 3</a>
</body>
</html>
```

Menu 1  Menu 2  Menu 3

FIG. 7A

```
<html>
<body>
<a href="page1.htm">Menu 1</a>
<a href="page2.htm">Menu 2</a>
<a href="page3.htm">Menu 3</a>
<p><a href="page11.htm">Menu 1.1</a><br>
<a href="page12.htm">Menu 1.2</a></p>
</body>
</html>
```

Menu 1  Menu 2  Menu 3

Menu 1.1
Menu 1.2

FIG. 7B

```
<html>
<body>
<a href="page1.htm">Menu 1</a>
<a href="page2.htm">Menu 2</a>
<a href="page3.htm">Menu 3</a>
<p><a href="page21.htm">Menu 2.1</a><br>
<a href="page22.htm">Menu 2.2</a></p>
</body>
</html>
```

```
Menu 1  Menu 2  Menu 3

Menu 2.1
Menu 2.2
```

FIG. 7C

```
<html>
<body>
<a href="page1.htm">Menu 1</a>
<a href="page2.htm">Menu 2</a>
<a href="page3.htm">Menu 3</a>
<p><a href="page221.htm">Menu 2.2.1</a><br>
<a href="page222.htm">Menu 2.2.2</a><br>
<a href="page223.htm">Menu 2.2.3</a></p>
</body>
</html>
```

```
Menu 1  Menu 2  Menu 3

Menu 2.2.1
Menu 2.2.2
Menu 2.2.3
```

FIG. 7D

| Menu 1 | Menu 2 | Menu 3 |
|---|---|---|
| Menu 1.1 | Menu 2.1 | |
| Menu 1.2 | Menu 2.2 | Menu 2.2.1 |
| | | Menu 2.2.2 |
| | | Menu 2.2.3 |

• About   • Products   • Links   • Sitemap

FIG. 9A

| • About | • Products | • Links | • Sitemap |

• Consulting
• Statistics
• Online marketing
• Virus protection

FIG. 9B

SYSTEM, PROCESS AND SOFTWARE ARRANGEMENT FOR ASSISTING IN NAVIGATING THE INTERNET

CROSS-REFERENCE TO RELATED APPLICATIONS

The present application claims priority from Norwegian Patent Application No. 20056187, filed Dec. 5, 2005, the entire disclosure of which is incorporated herein by reference.

FIELD OF THE INVENTION

The present invention relates to a system, method, software arrangement and computer-accessible medium which can provide improved navigation of web content within a web site. The present invention further relates to a system, method, software arrangement and computer-accessible medium for providing navigational menus that facilitate access to specific web pages and specific content on web pages located within a web site, without the need to load or browse intermediate or top-level pages in a hierarchy of the site.

BACKGROUND INFORMATION

The Internet provides users access to a multitude of web sites. These web sites can be made up of web pages, which may be linked together using a hypertext markup language ("HTML") code. There is currently no standard procedure for navigating through a web site to pages located at an intermediate or lower level. Different web sites may have different link structures and interfaces. This can make navigating different web sites much more complex and demanding than necessary.

Some of the existing approaches to providing or facilitating web site navigation may suffer from one or more of the following disadvantages:

a) Locating a navigation menu on current web sites can be a time-consuming process. The placement of such a menu can differ from one web site to another. Current web sites may have the top-level menu links located at or near the top of a web page, or in a column on the left or right side of a page. Certain web sites may also have unique or non-standard navigation aids or menus.

b) Locating specific menu content on current web sites can be a time-consuming process. The placement of, for example, the contact information within a link structure is not standardized among different web sites, which can require the user to locate it for each individual site.

c) The layout of menus on a given web site can make navigation a time-consuming process. Menus for various web pages may differ in design, colors, fonts, graphics, symbols, pictures and/or text size.

d) Navigating to a web page that is several levels deep within a web site can be a time-consuming process. A web site may include a plurality of pages linked together in a hierarchic structure that may contain several levels. To reach the web page that is several levels deep in the site hierarchy, the user may need to browse the pages on the levels in-between to access the specific web page.

e) To navigate a web site, each web page may have to be loaded into the browser. It may not be possible to navigate down to any specific page within a web site directly, or to only load a desired page without loading or browsing intervening pages.

f) In a conventional site navigation, the total link structure often may not be available from all web pages. Many web sites can require that the navigation begins from the first page of the web site. When browsing a page at a sublevel, a user may be required to return to the first page to then navigate to a different category, instead of having all possible category links available from every page within the site.

g) It may not be possible to select the language of the menu labels for a web site.

h) Creating a navigational menu on the web site can require an implementation of a specific link structure on each web site, either by manually providing such information or by using software or web publishing systems to create it. The link structure for each web site may also have to be implemented on the specific web site.

i) Browsing web content on small-screen devices, such as personal digital assistants ("PDAs") and mobile phones, can be difficult because it may be hard to both view and select specific items on the available menus.

j) Browsing the web content on a television-based system may be difficult because a movement of the cursor on such systems via a remote control can be inaccurate.

Thus, there is a clear need to provide navigational aids and menus for existing and new web sites, which can improve access to the specific content and web pages within these sites.

SUMMARY OF EXEMPLARY EMBODIMENTS OF THE INVENTION

To address such need, methods, systems, software arrangements, and computer-accessible media are provided for availing hierarchal menus which can enhance and simplify the navigation of web sites.

For example, exemplary embodiments of the present invention may include one or more of the following:

a) provide a standard location of navigation menus for browsing web sites;

b) provide specific menu content, such as contact information, in a standard location and layout to facilitate the accessing of the content on a web site;

a) provide options to users to vary characteristics of the text used to display menu items, including size, font, style, color, and the like;

c) provide an ability to navigate to the web pages within the hierarchy of the web site, without requiring loading or browsing of intermediate web pages;

d) permit the navigation directly to a specific page of the web site, and load only the desired page without loading any other page, even if the desired page has not been previously loaded or browsed by the user;

e) permit access to a total or partial navigational menu structure of the web site that is available from any web page within the web site;

f) permit a selection and/or a change of the language of the navigational menu labels of the web site;

g) generate and use of web site navigational menus which do not have to be implemented on the web site or the web site server itself;

h) provide a standardized menu system for the improved navigation of the web content accessed via small-screen devices such as PDAs and mobile phones;

i) provide a standardized menu system for the improved navigation of the web content accessed via a TV-based system;

j) provide a standardized menu system that may be limited to a preselected number of top-level menu items, total number of menu items and/or number of menu levels; and k) provide storage of data related to the navigational menus on a local memory cache for faster access when revisiting a web site.

These and other objects, features and advantages of the present invention will become apparent upon reading the following detailed description of embodiments of the invention, when taken in conjunction with the appended claims.

BRIEF DESCRIPTION OF THE DRAWINGS

Further objects, features and advantages of the invention will become apparent from the following detailed description taken in conjunction with the accompanying Figures showing illustrative embodiments of the invention, in which:

FIG. 7A is an exemplary listing of source code for a first exemplary web page of the web site, provided with the associated web page;

FIG. 7B is an exemplary listing of source code for a second exemplary web page of the web site, provided with the associated web page;

FIG. 7C is an exemplary listing of source code for a third exemplary web page of the web site, provided with the associated web page;

FIG. 7D is an exemplary listing of source code for a fourth exemplary web page of the web site, provided with the associated web page;

FIG. 9A is an illustration of an exemplary main menu bar for an exemplary web page;

FIG. 9B is an illustration of exemplary submenus associated with the main menu bar shown in FIG. 9A;

DETAILED DESCRIPTION OF EXEMPLARY EMBODIMENTS OF THE INVENTION

The exemplary embodiments of the system, method, software arrangement and computer-accessible medium according to the present invention, referred to herein as "bMenu," can be implemented using the following exemplary techniques, procedures and arrangements.

According to certain exemplary embodiments of the present invention, a system, method, software arrangement and computer-accessible medium can be provided for generating a drop-down menu interface for existing web sites. This exemplary menu interface may be hierarchal. The exemplary embodiment of bMenu described herein can detect all or part of the web page hierarchy and structure of the particular web site, and may convert this into menu data. The menu data can be stored in a central database and accessed or made available when requested from a client computer. The client computer and web browser operating thereon can convert this menu data to a dropdown menu interface, thus enabling a user to navigate the web site with a menu.

Figure 1:
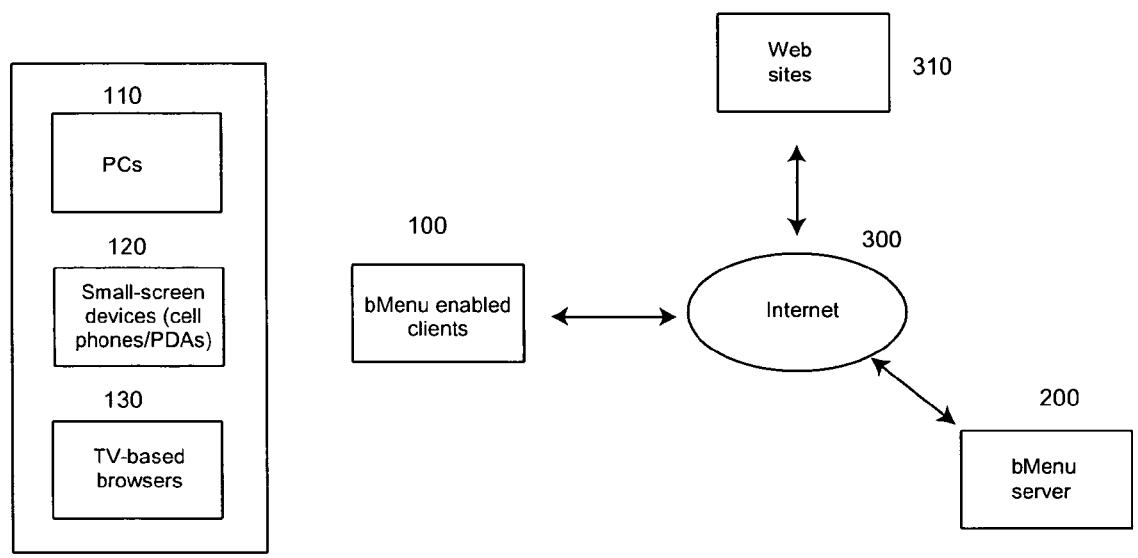
FIG. 1 is a block diagram of an exemplary embodiment of a system according to the present invention.

FIG. 1 shows a block diagram of one exemplary embodiment of a system according to the present invention that can be configured to access Internet content. In this embodiment, an exemplary bMenu-enabled client ("client") 100 may be configured to communicate with web sites 310 (which may be located on various web servers) through a bMenu server ("server") 200 via the Internet 300. The client 100 may include, but is not limited to, a personal computer ("PC") 110, a personal digital assistant ("PDA") 120, a television-based web browser ("TV browser") 130, etc.

The client 100 may provide a uniform resource locator ("URL") or other information capable of identifying the web site 310 (which the client 100 may be browsing or accessing) to the server 200. The server 200 may respond by providing menu data for the requested web site to the client 100 if it is available on the server 200. The client 100 can then use the menu data to generate and display a navigational menu, and may enable the user utilizing the client to navigate the content of the web site 310 by selecting menu items within the navigational menu. The exemplary embodiment of the system according to the present invention can also be configured such that both the client 100 and the server 200 may be executed on the same computer.

Figure 2:
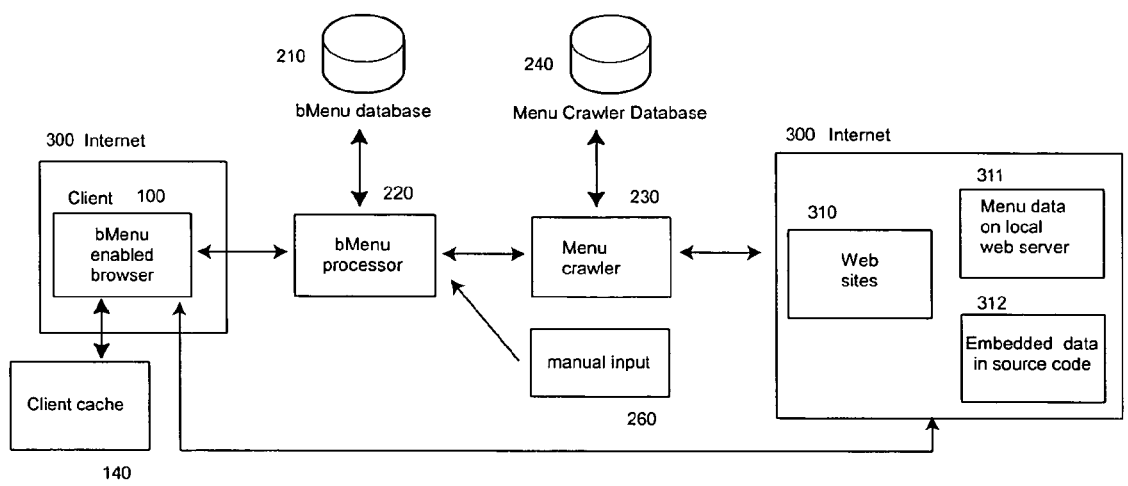
FIG. 2 is a block diagram of a second exemplary embodiment of the system according to the present invention.

Another exemplary embodiment of the system according to the present invention is shown as a block diagram in FIG. 2. In this exemplary embodiment, the system comprises four modules; e.g., the client 100, the bMenu database 210, the bMenu processor ("processor") 220, and the bMenu crawler ("crawler") 230, which may be in communication with a crawler database 240.

The crawler 230 may comprise a standard program or software arrangement stored in memory or another storage arrangement (e.g., hard drive, flash drive, CD-ROM, etc.) which, when run, can configure an associated processor, which may be the bMenu processor 220, to access and/or read Internet- or web-based content 300 by following links on web pages that it accesses. The crawler 230 can be programmed or, alternatively, obtained as an existing software package.

The crawler 230 can configure the processor 220 or, alternatively, a different processor, to "crawl" a web site (e.g., browse or access web pages, optionally without direct supervision or control by a user or a system administrator) for links located on web pages within the site, and detect the link structure of the web site. The link structure of a web site can relate to the links associated with web pages within the web site, which may comprise URLs that identify other web pages within the web site, and the interrelated structure and/or hierarchy of these links.

The crawler 230 can also detect menu data that may optionally be located on a local web server 311 and/or embedded in source code 312 of the web page. The menu data provided on or accessed by a local web server can be placed in a file at root level, e.g., similarly to the way that conventional robot.txt files may be associated with web pages and provided for search engine crawlers. The file containing such menu data may be assigned a predetermined name that can be recognized by the crawler 230 such as, e.g., bMenu.txt. Menu data optionally embedded in the source code of the web site can be provided, e.g., in the form of individual links or as a menu structure of the entire web site, and may be included in the first or main page of the web site. The menu data can be identified by a predetermined tag which may be recognized by the crawler 230 such as, e.g., <bMenu>.

The "link rel" code, which may be implemented by some existing web sites, can represent an example of this type of embedded data coding. However, <link rel> tags generally provide one level of menus, and it is possible that they may not include hierarchal information that can permit generation of a hierarchal menu scheme.

The URL of the web site that the crawler 230 accesses may be located in a crawler database 240. The crawler database 240 can contain a record for each URL accessed by the crawler 230, where the record can include information such as, e.g., a date that the site was most recently accessed or crawled, which may be used by the crawler 220 to keep the crawler database 240 updated, and which can further reduce or eliminate dead and/or duplicate links.

For example, the crawler 230 can communicate via the Internet 300 to crawl or access the web site 310, send the link structure obtained therein to the processor 220, and then receive additional URLs from processor 220 to crawl. The URLs and corresponding link structures thus obtained may be stored in the crawler database 240.

The processor 220 can be configured to process information obtained from the crawler 230, and utilize that information to generate the menu data. The menu data may then be stored in the bMenu database 210. Optionally, the crawler database 240 and the bMenu database 210 may be stored on the same server. Exemplary flow diagrams of exemplary process and methods for generating the menu data are shown in FIGS. 5A-5E, which are described below in further detail.

In certain exemplary embodiments of the method according to the present invention, the processor 220 may also handle requests for receipt and/or generation of the menu data from the client 100 and can respond to these requests by providing the menu data obtained from the bMenu database 210. When there is no menu data available for the requested web site on bMenu database 210, a message or instruction may be transmitted to the crawler 230 to crawl or access the web site to obtain the link structure or other information from the web site, which may be used to generate the menu data. In certain exemplary embodiments of the present invention, the processor 220 can also be configured to receive preprocessed menu data either directly or indirectly via a manual input 260.

The menu data may comprise, but is not limited to, the menu structure of the web site. The menu data may comprise individual menu components, and it can be presented in several ways. For example, each menu component within the menu data may have a specific name or label to identify it. A menu component that is configured to lead or direct to the web page or location within the web site may further comprise an URL or a link. The menu data may further comprise tagging or listing information that is capable of defining a hierarchal structure, which can be converted to a hierarchal menu that may be displayed or accessed by the client 100. A listing of exemplary menu data that may be generated for the exemplary web site link structure shown in FIGS. 6A and 6B can be as follows:

```
<bMenu>
    <menu name="Menu 1" url="page1.htm">
        <link url="page11.htm">Menu 1.1</link>
        <link url="page12.htm">Menu 1.2</link>
    </menu>
    <menu name="Menu 2" url="page2.htm">
        <link url="page21.htm">Menu 2.1</link>
        <menu name="Menu 2.2" url="page22.htm">
            <link url="page221.htm">Menu 2.2.1</link>
            <link url="page222.htm">Menu 2.2.2</link>
            <link url="page223.htm">Menu 2.2.3</link>
        </menu>
    </menu>
    <menu name="Menu 3" url="page3.htm">
    </menu>
</"bMenu">
```

Exemplary HTML code describing the web site, together with the appearance of corresponding web pages generated by the code, is shown in FIGS. 7A-7D.

The bMenu database 210 may be used for storing the menu data. The bMenu database 210 can store the data as plain text and/or utilize conventional database software to make the storage and handling of the menu data more efficient. The menu data stored on the bMenu database 210 can be provided and/or accessed by the processor 220.

The client 100 may be a web browser that is capable of requesting and receiving the menu data received from the processor 220. The client 100 may include, but is not limited to, a browser application accessed via a personal computer, a TV-based browser that can display web content on a television, or a device comprising a software application and a display that can be configured to access and/or browse web content, such as a mobile phone or a PDA. Conventional browser software applications may include Microsoft's Internet Explorer, Netscape, Firefox, Opera or the like.

Existing browsers or other software applications may be enabled to operate or integrate with the exemplary embodiments of the bMenu system of the present invention by implementing native support for bMenu within the browser software code with the use of client-side scripting, and/or by the use of a software component running separately on the client 100. The software component may include a bar which can be displayed at the top of a browser window, such as the search bar provided by Google or Yahoo! Implementing native support can mean that the exemplary embodiments of the bMenu system may be integrated as parts of the browser's software application. The software component that may be configured to display and use the menu data can be programmed, for example, in C++, Java, Visual Basic, Delphi, NET, etc. The choice of a computer language to use can depend on the browser and the operating system. For example, it may only be possible to use .NET to implement the exemplary bMenu system of the present invention into the Microsoft Explorer.

To enhance performance, the client 100 may locally store the menu data associated with frequently accessed web sites. The client 100 may search a cache 140 for the menu data and retrieve such data, if present, rather than sending a request to retrieve web site information by crawling the web site, and generate the menu data. The cached menu data may also have a date or other marker associated with it, which may be compared to data associated with the web site itself to determine if the cached data is current or outdated. If the cached data is determined to be outdated, e.g., because the web site has been modified since the cached data was obtained, then current menu data can be obtained by crawling or accessing the web site again as described above, and such new menu data may be stored on the cache 140.

The client 100 can optionally identify and use the menu data 311 that may be stored on a server hosting the web site 310. The menu data 311, if present, may be retrieved by the crawler 230, and supplied to the processor 220. Alternatively, the menu data 311 associated with a particular web site may be provided by a third party as a preconfigured data file. The webmaster or owner of the web site can create a file containing the menu data 311, and associate the file with the web site 310 on the server hosting the web site. If the optional local menu data 311 is detected by the crawler 230 when accessing the web site, the data can be retrieved and displayed as described above. Alternatively, the client 100 may provide a request to the crawler 230 to locate and retrieve the menu data 311 embedded in the source code 312 of the web site, if present.

Figures 8A, 8B:
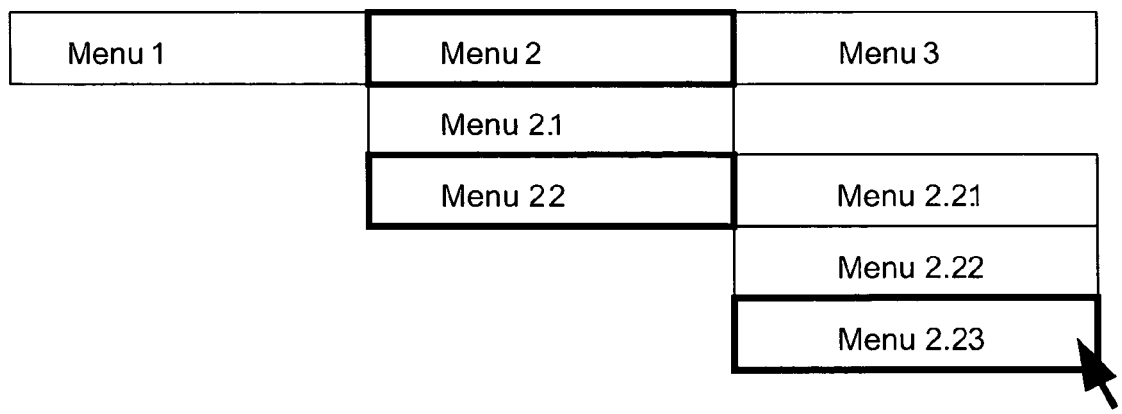
FIG. 8A is an illustration of an exemplary menu structure corresponding to the exemplary web pages shown in FIG. 7A-7D.
FIG. 8B is an illustration of the menu structure of FIG. 8A with particular elements being highlighted.

In certain exemplary embodiments of the present invention, the menu data may be displayed via an interface comprising drop-down menus, and such menus may optionally be hierarchal. The drop-down menus can enable a user to navigate the web site in a conventional and familiar manner. FIG. 8A shows an exemplary drop-down menu structure generated by the exemplary XML code described above, which corresponds to the exemplary filtered link structure shown in FIG. 6B. FIG. 8B shows the display and selection of hierarchal menus using the menu structure of FIG. 8A.

In certain exemplary embodiments of the system according to the present invention, a manual input 250 may be used to provide menu data directly to the processor 220. The manual input can be performed, e.g., by using a menu editor or other software program structured to order or arrange the links located within the web site. The manual input can be provided, e.g., in the form of a file containing the menu data or as a data feed or stream that can serve as input to the database 210.

In one exemplary embodiment of the present invention, menu item names, or menu labels, may be translated into different languages. For example, the menu labels can first be stored in the menu database. A dictionary for each desired language can also be stored in the database or in another database that can be accessed. A dictionary may include a list of corresponding words provided in two or more languages. To allow for automatic translation of the menu labels, the most common translation of each word and expression may be provided. The menu labels in the menu data file can then be translated, and the translated results can be stored in the menu file, or alternatively in another menu data file, which may be accessed as described above. Each menu data file may optionally include a marker and/or identifier indicating which language or languages have been used for the menu labels contained therein.

In further exemplary embodiments of the present invention, the crawler 230 may be configured to access and identify certain content of a web site by following the link structure contained therein. The links structures can be transmitted to the processor 220, and may be processed and converted to the menu data. The processor 220 can use different methods and/or procedures for generating menu data, which may depend on the structure and the content of the web site. In one exemplary embodiment of the present invention, the crawler 230 may detect the existing link structure, filter it for duplicates, and convert this information into the menu data, which may then be stored in the bMenu database 210. The client 100 may be configured to transmit a request for the menu data to the processor 220 each time the user requests access to an URL via the browser. The processor 220 may then access the bMenu database 210 to search for menu data associated with the requested URL, retrieve the menu data if located, and provide it to the client 100. If the requested menu data is not available on the bMenu database 210, the processor 220 can provide the URL of the web site to the crawler 230, and the crawler 230 can then access or crawl the web site associated with the URL to retrieve the site's link structure and generate the menu data, as described above. The URL and information retrieved from the corresponding web site by the crawler 230 may be stored in the crawler database 240.

Figure 3A:
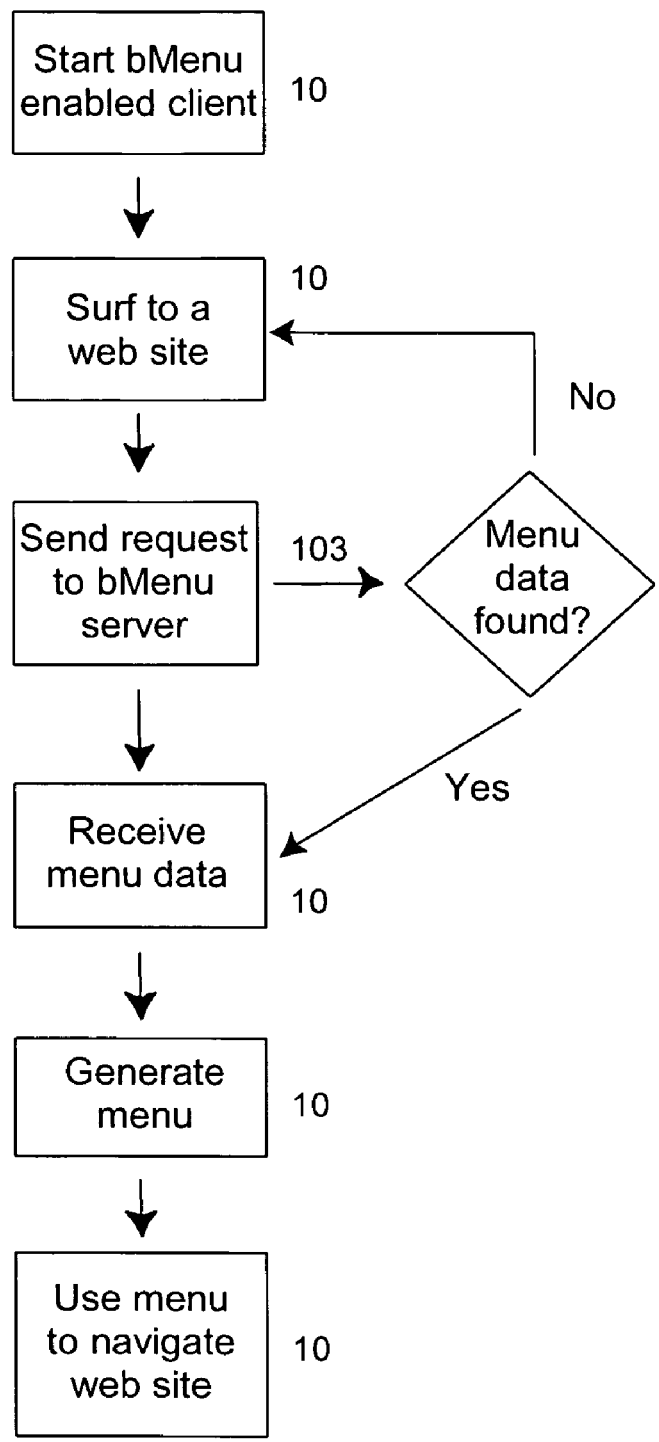
FIG. 3A is a flow diagram of an exemplary embodiment of a method according to the present invention.

A flow diagram of a method according to certain exemplary embodiments of the present invention is shown in FIG. 3A. This exemplary diagram shows exemplary steps that may be used to access and use navigational web page menus. For example, a user may access the bMenu system by starting a bMenu-enabled client (step 101). The client may be a browser which is configured to access and display content located on the Internet. The user may then browse the web site (step 102), and the bMenu-enabled client can then transmit a request to the bMenu server for the menu data associated with the URL of the web site that the user is browsing (step 103). If the requested menu data is not available on the bMenu server, then the user may continue browsing without loading the navigational menus (step 102). If menu data corresponding to the requested URL is located, then the bMenu server may transmit the menu data to the bMenu-enabled client, which can be configured to receive the menu data (step 104).

After the bMenu-enabled client receives data from the bMenu server, a menu may be generated (step 105) and displayed by the client. An exemplary generated menu is shown in FIGS. 8A and 8B. FIG. 8A shows the complete hierarchal menu tree structure associated with the exemplary menu data provided above. FIG. 8B illustrates an exemplary use of the generated hierarchal menus to navigate the web site. In this exemplary menu, the user selected the menu item labeled Menu 2.2, which is a sub-menu item linked to the menu item labeled Menu 2, and has further selected the sub-menu item labeled Menu 2.2.3, which may comprise a link to the corresponding web page entitled "page223" in the code. The user may navigate directly to the web page entitled "page223" within the web site by, for example, clicking and releasing on the menu item labeled Menu 2.2.3 as shown in FIG. 8B (step 106). By using this exemplary navigational menu, the user can directly access the web page associated with the menu item labeled Menu 2.2.3 without having to load, browse or access the intermediate web pages associated with the menu items labeled Menu 2 and/or Menu 2.2. The navigation of the web site may further be performed in this manner without using existing menus or links provided by the web site.

Figure 3B:
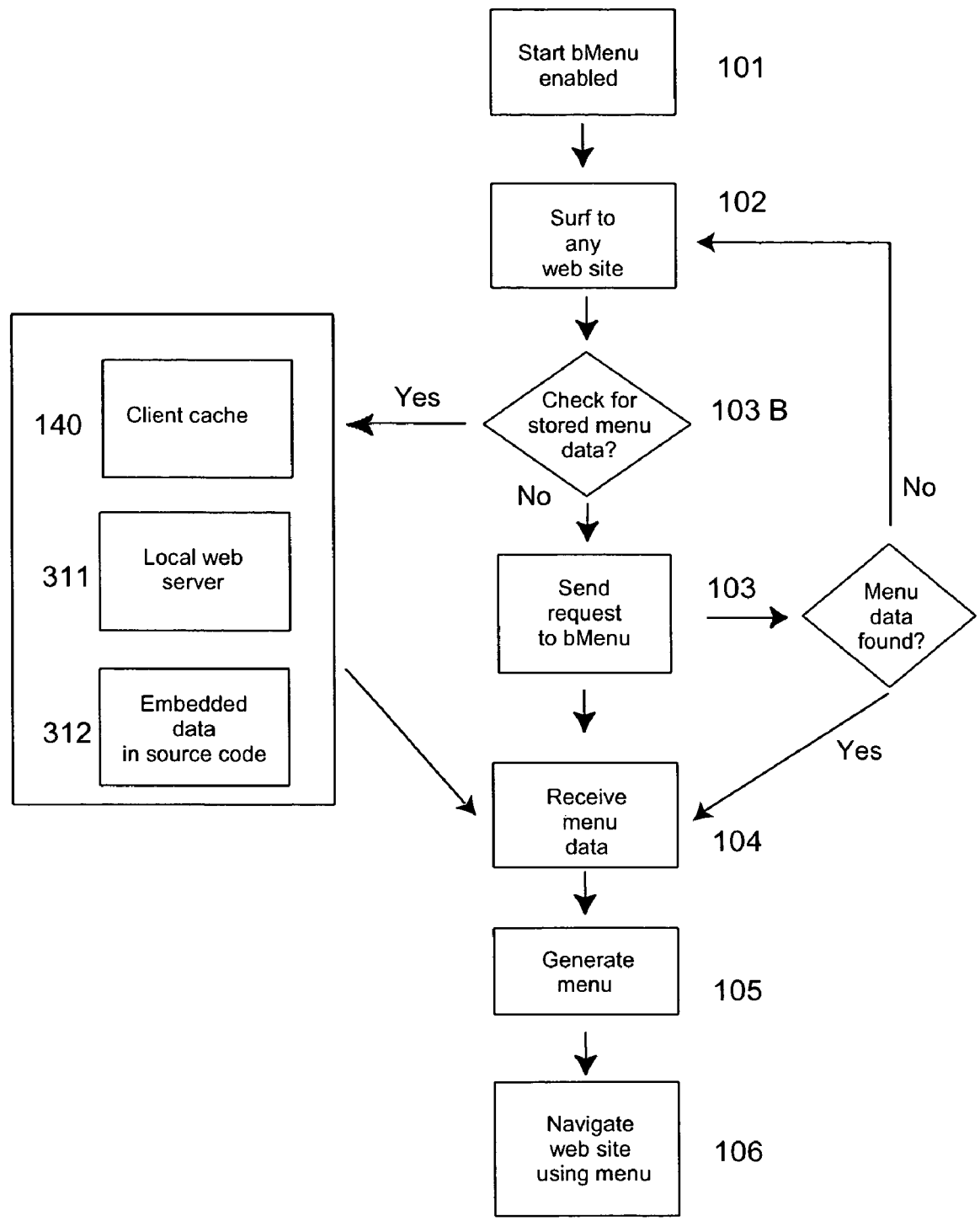
FIG. 3B is a flow diagram of a second exemplary embodiment of the method according to the present invention.

A flow diagram of the method according to further exemplary embodiments of the present invention is shown in FIG. 3B, which illustrates exemplary steps that can provide navigational menus which may be used to access the web pages directly. This exemplary embodiment provides an exemplary sequence of steps that includes checking various sources for requested menu data (step 103B), and accessing this menu data if it is available.

A bMenu-enabled client can search for menu data (step 103B) in a client cache 140, on a local web server 311, or in source code 112 of the web site being accessed. If the menu data is located in any of these locations, it can be compared with menu data that may be stored on a bMenu server, the most recent data may be provided to the bMenu-enabled client, and navigational menus based on the current data may then be generated (step 105). If it is not possible, for whatever reason, to determine the most recent version of the menu data found, then the size of the menu data fields may be used. For example, the larger data file may optionally be selected and used to generate menus, based on the assumption that the web site may grow in size and have more web menu data as time passes. Alternatively, the data located on the bMenu server can be selected as a default option. The order of priority for selecting which set of menu data to use can also be predetermined by an administrator of the web site or server.

Figure 4:
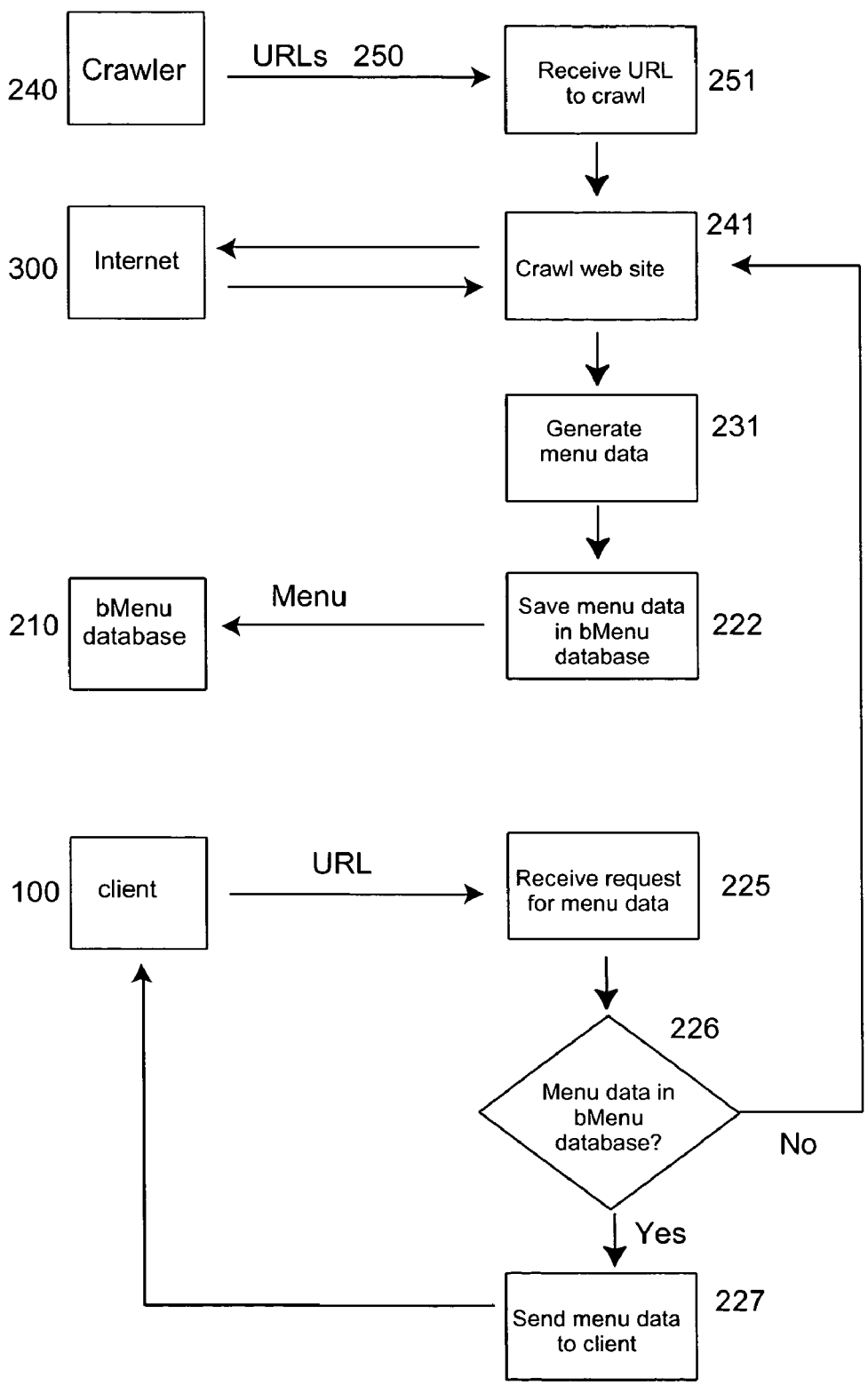
FIG. 4 is a flow diagram of a third exemplary embodiment of the method according to the present invention.

A flow diagram of the method according to further exemplary embodiments of the present invention is shown in FIG. 4, which shows exemplary procedures that may be used by a server to provide navigational web page menus. The crawler can receive an URL identifying a web site to crawl or access (step 251) from a crawler database 250. The crawler can then crawl or access the web site (step 241) which may be accessed via the Internet 300. The amount of data obtained by the crawler may depend on the structure and content of the web site. Preferably, only the link structure of the web site can be retrieved and sent to a processor, such as the bMenu processor 220. Optionally, a greater amount of information or the entire content of certain web sites may be sent to the bMenu processor 220 and/or to another processor.

The bMenu processor 220 may then generate the menu data (step 231) based on the data received from the crawler. The menu data can then be recorded in a bMenu database 210 (step 222), where it may be made available upon request from the client 100. A request for menu data may comprise an URL of a web site that the user is browsing via the client 100. The processor can receive the menu data request from a client 100 (step 225), and then query the bMenu database 210 (step 228) to determine if the requested menu data is stored therein. If the requested menu data is not available in the bMenu database 210, the URL may be provided to the crawler, and the crawler can then crawl or access the web site (step 241) to obtain the requested menu data. If the requested menu data is located in the bMenu database 210, the menu data can be retrieved by the processor and provided to the client 100 (step 227).

Figure 5A:
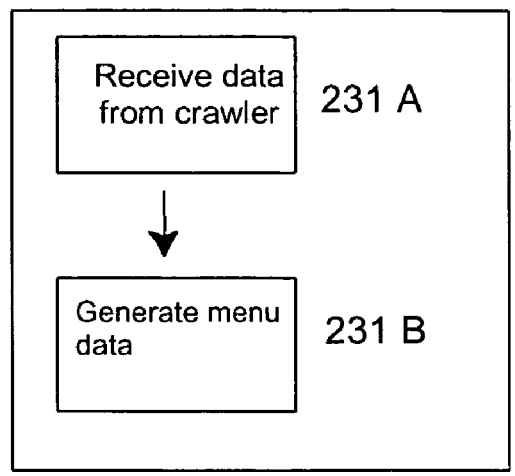
FIG. 5A is a flow diagram of a fourth exemplary embodiment of the method according to the present invention.
Figure 5B:
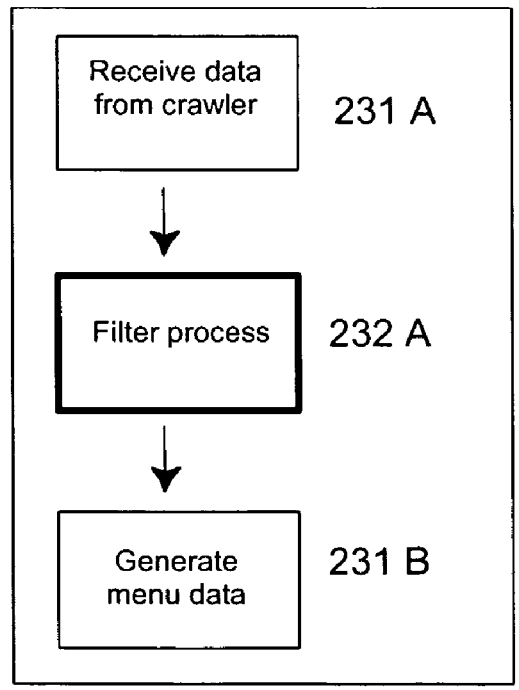
FIG. 5B is a flow diagram of a fifth exemplary embodiment of the method according to the present invention.
Figure 5C:
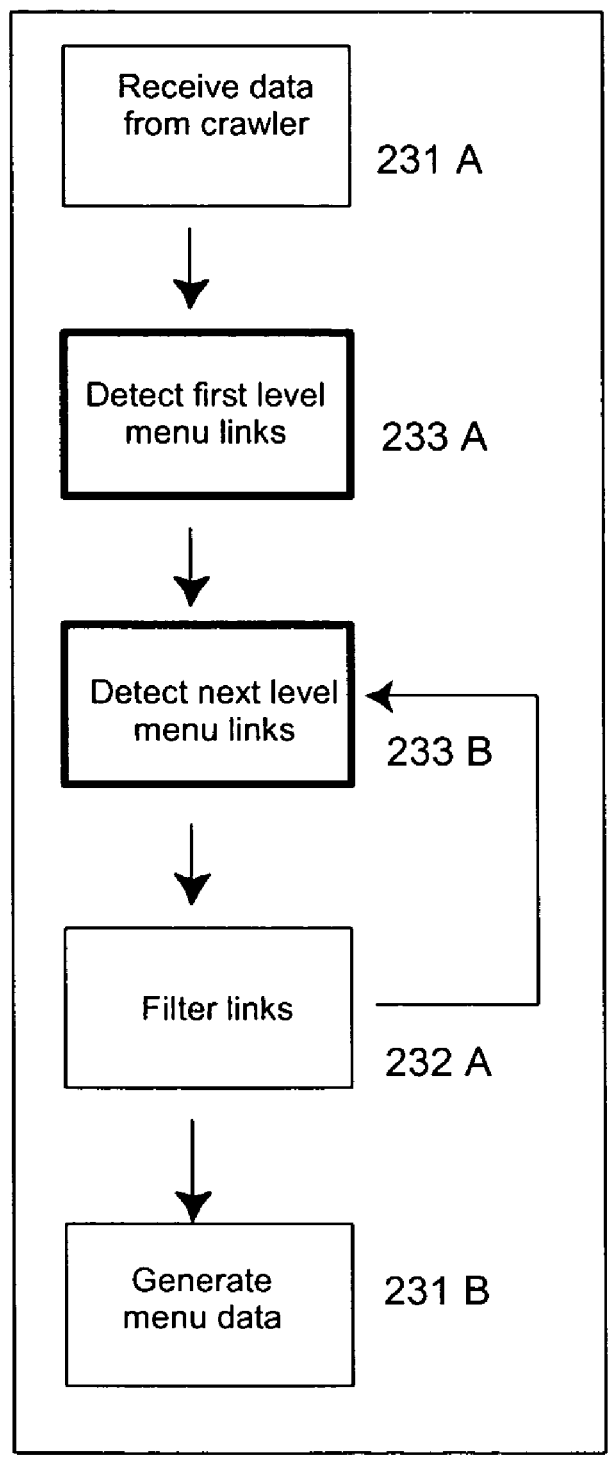
FIG. 5C is a flow diagram of a sixth exemplary embodiment of the method according to the present invention.
Figure 5D:
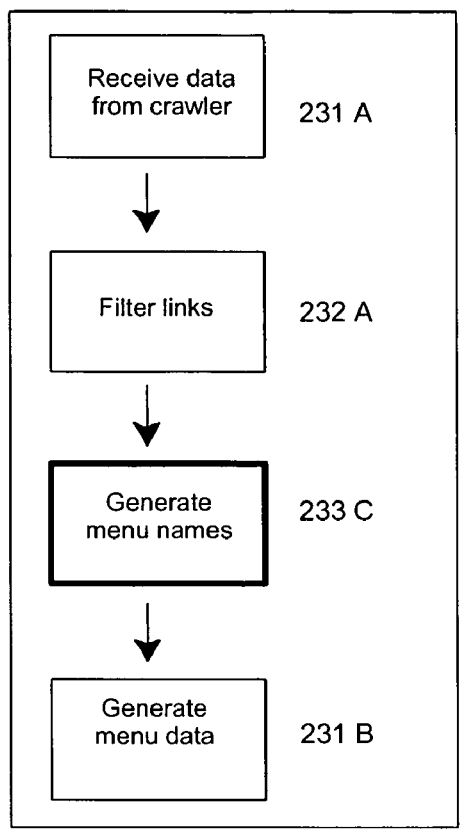
FIG. 5D is a flow diagram of a seventh exemplary embodiment of the method according to the present invention.

FIGS. 5A-5F illustrate certain exemplary embodiments of processes in accordance with the present invention that allow generation of a tree structure of the menu data. Several procedures may be employed to generate the tree structure of the menu data. A first exemplary approach, shown in FIGS. 5A-5C, can comprise using links detected within the web site to generate the navigational menu. FIG. 5D shows an exemplary process for generating menu labels for each link and associated menu item. A second exemplary approach, shown in FIG. 5E, can comprise locating and utilizing a catalog structure of the web site as the menu structure of the web site. A third exemplary approach, shown in FIG. 5F, can comprise detecting and utilizing an existing menu system that may be found on the web site.

In the exemplary menu data generation process shown in FIG. 5A, the processor receives a link structure associated with the web site from the crawler (step 231A). The link structure may comprise the links located within the web site, which may be presented as a tree structure comprising the pages that the links occur on. The link structure may further comprise the linking relationships between pages, which can specify the target page associated with each link within the web site. To detect the link structure, the crawler may crawl or access some or all links within the web site domain, and can ignore links which already have been detected and/or those which lead to pages outside of the web site (e.g., "external" links). The processor can then generate the menu data based on the link structure (step 231B). Some or all of the links present on the first or main web page of the web site may be configured as top-level links, which may be visible directly in a menu bar or other menu displayed by a client. Examples of such top-level menu items can include the items labeled Menu 1, Menu 2, and Menu 3 in the exemplary menu structure shown in FIG. 9A.

Figure 6A:
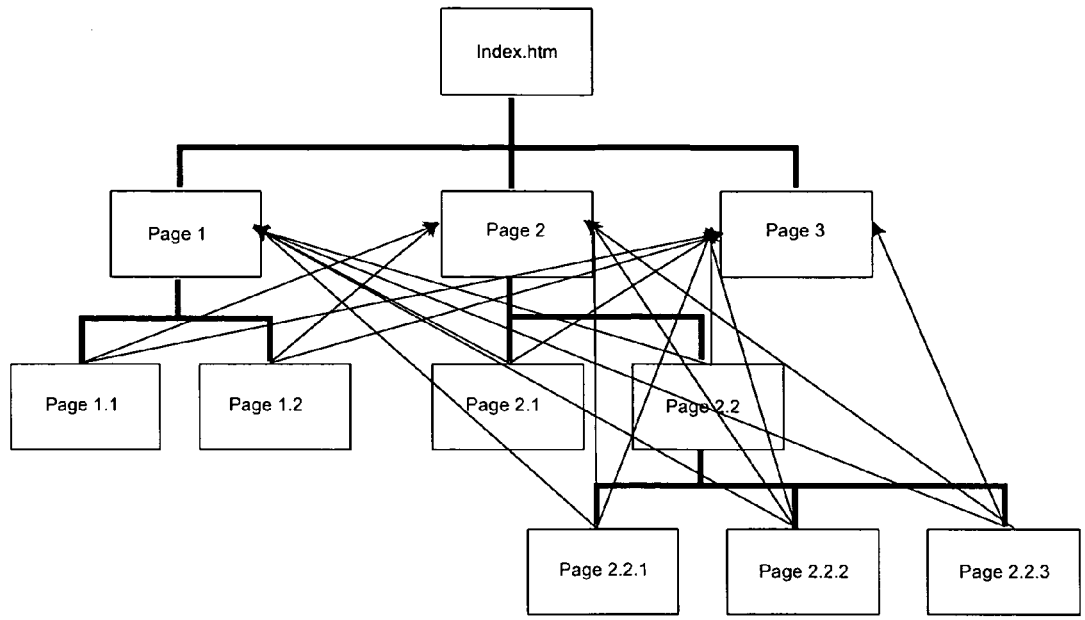
FIG. 6A is a hierarchal diagram of an exemplary link structure of a web site.

An exemplary web site link structure is shown in FIG. 6A. In this example, only the HTML code of four of the web pages containing new links may be needed to generate the menu data for the entire web site. These four pages are labeled Index.htm, Page 1, Page 2, and Page 2.2 as shown in FIG. 6A. FIGS. 7A-7C show an exemplary HTML code that may be used to generate these four pages, including the URL links that form the link structure shown in FIG. 6A. FIGS. 7A-7D also show the exemplary web pages associated with the exemplary HTML code. The web pages shown in FIGS. 7A-7D contain links to other pages within the web site, consistent with the link structure shown in FIG. 6A.

The exemplary index page shown in FIG. 7A may comprise three links, labeled Menu 1, Menu 2 and Menu 3, together with the URLs of the web pages associated with these links. These three links may be configured as top-level links because they are on the first page of the web site. Page 1, shown in FIG. 7B, may comprise five links as shown in the source code. These links are labeled Menu 1, Menu 2, Menu 3, Menu 1.1 and Menu 1.2. Page 1 may further comprise the URLs associated with the web pages corresponding to these links. These exemplary links can be configured as second-level links, because they are links located on a page that can be accessed via a top-level link.

The generated menu data can be presented in several ways. An exemplary format of the generated data is shown in FIGS. 8A and 8B, and in the code provided above. Each line of the exemplary XML code provided above may contain a menu component together with a name or menu label, together with the URL of a corresponding web page. If the web page associated with the menu component comprises a link to a second page or location, a lower-level menu component may be associated with the second web page. The menu components may be listed or tagged in an appropriate structure to facilitate creation of a corresponding hierarchal menu structure, such as the exemplary structure shown in FIG. 8A.

Certain exemplary menu items may be repeated on several menu levels because the menus containing these menu items may be available on several pages within the web site. An example of a menu item appearing on several pages within a web site may be a menu item in the main menu of the site, because the main menu may be provided on several or all pages within the web site. Alternatively, there may be links to a particular web page stored within or by the web site that are provided on a plurality of other web pages at various levels within the site.

The menu structure generated from the link structure of the web site can be simplified by the use of an exemplary filter procedure, such as that shown in FIG. 5B. In this exemplary procedure, a processor may receive link structure data associated with a web site from a crawler (step 231A). The menu structure can then be filtered to reduce or eliminate multiple occurrences of links within the menu data (step 232A). The filter process can be performed hierarchally by deleting the links on the lower menu levels if they can be located on a higher menu level of the web site menu structure, where a higher menu level can be understood to refer to a menu level that can be accessed through fewer connected links starting from the top-level or main menu. For example, the menu item labeled Menu 2.2 in FIG. 8B can be considered a second-level menu item that is situated one level below the main menu item labeled Menu 2, whereas the menu item labeled Menu 2.2.1 can be considered as a third-level menu item because it is situated two levels below the main menu item labeled Menu 2 and one level below the second-level menu item labeled Menu 2.2. Alternatively, when the crawler detects a web page that has already been accessed on the web site, it can associate the page within the link structure at a position that will have the shortest path to the top-level links. The processor can then generate menu data based on the filtered link structure (step 231B).

Figure 6B:
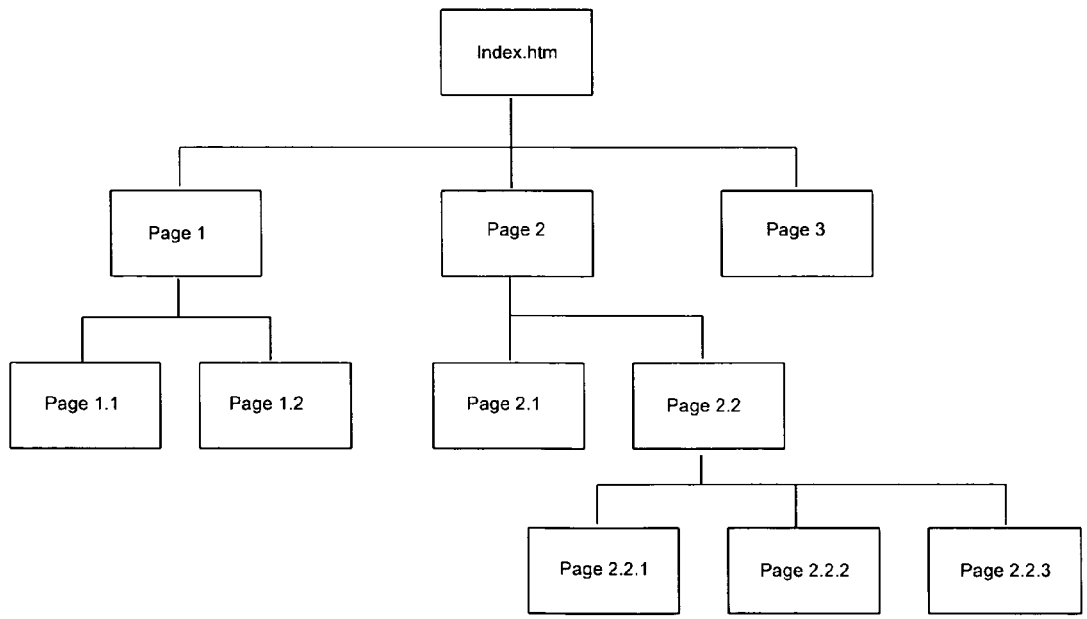
FIG. 6B is a hierarchal diagram of an exemplary filtered link structure of a web site.

The link structure of a web site may be viewed as a network of nodes, where every page may be considered as a node and every link can be considered as a way to travel or have access from one node to another. An exemplary node structure corresponding to a web site is shown in FIGS. 6A and 6B, where the rectangular web pages can represent nodes, and the arrows and black lines connecting them can represent links. The link between any two connected nodes may be one-directional, unless two pages each contain a direct link to the other. Each link may be considered to have a unit length. For example, the shortest path calculated between two nodes may be used to determine where in the link structure the pages or nodes may be located, and a page or node may be placed in a position that provides the shortest path to the top level. If a specific web page has two or more different paths to the main or top-level web page that are of equal length, then all but one path can be discarded when filtering the menu data, or duplicate links to the page may be allowed. External links that connect to other web sites may be discarded when generating the menu data. Alternatively, some or all links to one or more external web sites may be included in the menu data of a given web site if desired.

The link structure of an exemplary web site is shown in FIG. 6A, where the dark lines and the arrows can represent links between web pages. The arrows in FIG. 6A can indicate that the top level menu structure, comprising links to Page 1, Page 2 and Page 3, may be available from all web pages. These arrows may be considered to be secondary or back links. The exemplary filter process can detect these secondary links and may delete them to simplify the generated menu structure. The result of the filtering process may then be represented by the exemplary menu structure shown in FIG. 6B.

This exemplary filtering process may be described in more detailed with reference to the source code of the four web pages shown in FIGS. 7A-7D. For example, when the links on Page 1 in FIG. 7B. are filtered, menu data corresponding to the links Menu 1, Menu 2, and Menu 3 (which are links to Page 1, Page 2, and Page 3, respectively) can be deleted because those links may have already been detected on the Index.HTML page shown in FIG. 7A. The links labeled Menu 1.1 and Menu 1.2 (which are links to Page 1.1 and Page 1.2, respectively) may be retained in the generated and filtered menu data. In a similar manner, the links labeled Menu 2.1 and Menu 2.2 may be retained in the menu data as menu items and links associated with the exemplary web page labeled Page 2, shown in FIG. 7C. These links can be the second-level menus under the Menu 2 menu item, and they may also be stored as the second-level links for this exemplary web site, because they are located at the second level of menu links, below the Menu 2 link located at the first or top level. The web page labeled Page 2.2, shown in FIG. 7D, can include HTML code that contains links to Page 1, Page 2, Page 3, Page 2.2.1, Page 2.2.2, and Page 2.2.3. The links to Page 2.2.1, Page 2.2.2, and Page 2.2.3 may be placed in the menu data at a third level, because these pages are located one level below Page 2.2, which may be considered to be a second-level page. During the exemplary filtering process, the links associated with Menu 1, Menu 2 and Menu 3 may be deleted from the link structure directly associated with Page 2.2, and data associated with menu items Menu 2.2.1, Menu 2.2.2 and Menu 2.2.3 may be retained and stored as third-level links.

The code provided above shows an exemplary set of menu data generated from the web site link structure shown in FIG. 6A, after duplicate links and back links have been deleted by the exemplary filtering process described above.

A graphical block diagram illustration of an exemplary embodiment of a complete menu structure generated for the exemplary web site link structure of FIG. 6A is shown in FIG. 9A. The top-level menu may comprise the menu items labeled Menu 1, Menu 2 and Menu 3, and can include links from the Index.htm page to Page 1, Page 2 and Page 3, respectively. The menu item labeled Menu 1.1 can contain a link from Page 1 to Page 1.1, and the other menu items shown in FIG. 9A may contain similar links to the appropriate web pages shown in FIG. 6A.

FIG. 8B shows an exemplary block diagram of the menu data described above as it may appear while being displayed and used via a client. The black arrow may represent a cursor or other pointing indicator that can interact with the browser or other web content display on the client. Placing the cursor over the menu item labeled Menu 2 in the top-level menu can reveal the lower-level menu items labeled Menu 2.1 and Menu 2.2. The user may then move the cursor over the lower-level menu item labeled Menu 2.2, which may then reveal the next set of lower-level menu items labeled Menu 2.2.1, Menu 2.2.2, and Menu 2.2.3. The user may then move the cursor over the now-revealed menu item labeled Menu 2.2.3 and, by clicking a mouse button or performing another appropriate selection action while the cursor is pointing to this menu item, the user may activate the link associated with this menu item and navigate directly to Page 2.2.3. This process allows the user to navigate, e.g., directly to Page 2.2.3 and view its contents without having to load or otherwise access the intervening web pages labeled Page 2 and Page 2.2.

In certain exemplary embodiments of the present invention, a main menu of the web site may be provided and displayed while any page is being browsed or viewed within the web site. The web sites may have several shortcuts in their link structures, and they may include more than one link leading to a particular web page. A main index page provided by the existing web sites may have more links than may be desirable or practical in the top level menu, including direct links to some of the web pages that may be placed further down in the link structure hierarchy. Also, the space available to display top-level links may be limited by the use of certain web browsers or small-screen displays, particularly when the menu data may be presented in the form of a menu bar.

An exemplary process for detecting the top-level links within a web site and generating a top-level menu is shown in FIG. 5C. In this exemplary process, a processor can receive a link structure associated with the web site from a crawler (step 231A). For example, all of the links located on the front page of the web site may then be detected (step 233A). All of the links located on the next level of web pages may then be detected (step 233A). Initially, these web pages may include those that are linked directly from the front page, and can be considered as second-level links associated with the web site link structure. Links that are detected on both the front page and the second level of the web site structure may be identified as top-level links. These top-level links may be ordered according to the number of times they are detected, and links that appear on a larger number of pages within the web site can optionally be listed towards the top of the menu data listing. A partial menu structure may then be filtered to eliminate duplicate occurrences of the links within the menu data being generated (step 232A). After filtering, a next-lower level of links that includes links contained within the web pages of the current level may be detected. These next-lower level links may also be filtered as described above. The process of detecting and filtering the next-lower level of links may be repeated until all pages within the web site have been accessed. The processor can then generate the menu data based on the link structure obtained using the exemplary process described above (step 231B).

The top-level menu of the exemplary web site link structure shown in FIG. 6A can include the top level links labeled Menu 1, Menu 2 and Menu 3. The top-level menu may also be displayed as the top row of menu items shown in FIG. 8A.

In certain exemplary embodiments of the present invention, the size of the menu for the web site may be limited or truncated when obtaining menu data and generating the menu structure. The web sites may have thousands of web pages or more, and a navigational menu that can access each of these pages can be cumbersome and inconvenient. Also, it may be preferable to limit the number of menu items and associated links in a single sub-menu so that the hierarchal menus do not become too large and unwieldy to navigate or scroll through.

The menu size may be limited, e.g., by only including links internal to the web site (links within the same domain) when generating menu data, and ignoring links that lead to web pages outside of the web site domain. The menu size generated for a given web site may also be limited by specifying a cut-off level that corresponds to a maximum number of levels below the top level to crawl. The level or depth of a web page may be defined by the number of links present in the shortest path between the web page of interest and the top-level page. The exemplary embodiment of the process for generating the menu data according to the present invention shown in FIG. 5C may be stopped after filtering the links (step 232A) detected within the selected cut-off level, and then a final set of menu data can be generated (step 231B). Links on web pages that are at a deeper level than the selected cut-off level may be ignored, thus limiting the size of the navigational menus generated for the web site.

Alternatively, the size of the navigational menus generated may be reduced by limiting the total number of web pages and corresponding menu items to store as the menu data and/or to display for a certain web site. The size of the generated menus may also be limited by keeping only links to the web pages that have a predetermined page rank in the generated menu data. The page rank used in this exemplary process may be determined based at least in part on the level of the web page and/or the number of pages linking to the web page. Another option for limiting the size of the generated menus can include limiting the number of links and corresponding menu items associated with a web page to the number of menu items that can be clearly and/or conveniently displayed on the client or web browser. The links that are maintained within the menu data can be selected based on their relative ranking as described above. For large web sites, it may also be desirable to limit the number of menu items in the generated navigational menus to a number that may be updated within a reasonable timeframe.

FIG. 5D illustrates another exemplary process for generating a tree structure of menu data in accordance with certain exemplary embodiments of the present invention. This exemplary process is generally similar to the exemplary process shown in FIG. 5B, and further includes the generation of labels or names for menu items (step 233C). For example, the link text associated with a menu item or a portion thereof may be selected as a label for the corresponding menu item. The link text can include the text which appears together with the link on a client display, and which may be displayed to the user on a web page when it is viewed, e.g., via the web browser. The displayed link text may be underlined, and can also be displayed in a different color than the surrounding text. By performing a mouse click on displayed link text, the link associated with it can be activated. Examples of the link text may include the labels Menu 1, Menu 2 and Menu 3 shown on the exemplary web page in FIG. 7A.

Certain exemplary links may be accessed by clicking on a graphic element displayed on the web page, and may not have any link text associated with them. Examples thereof may include clickable buttons or other graphic elements such as a .JPG or .GIF image that may further comprise text within the graphic element. Menu item labels may be generated for the links associated with graphic elements using, e.g., conventional character recognition of the displayed text within the graphic elements, if any such text is present. Alternatively, if no text is detected as part of the graphic element, or if the graphic element is not displayed, an ALT tag may be used as a menu item label for the link. If there is no ALT tag present, the title of the target page associated with the link, or a portion thereof, may be selected as the menu item label. If there is no title on the target web page, a headline or first line of text in the body of the target web page may be selected as a menu item label. If there is not text present on the target web page, the file name of the document may be used. The menu item label generated by any of the exemplary processes described above may be truncated as appropriate.

Figure 5E:
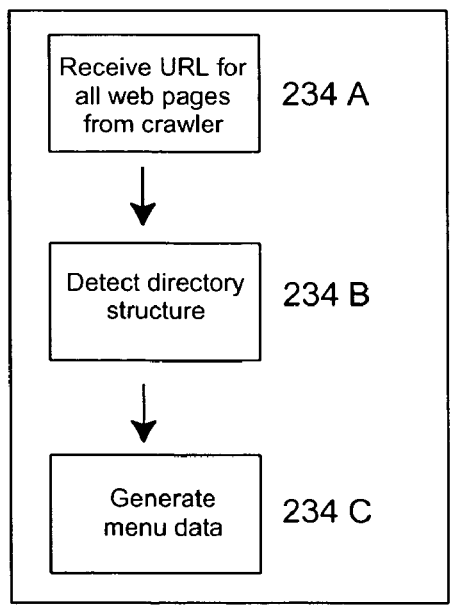
FIG. 5E is a flow diagram of an eighth exemplary embodiment of the method according to the present invention.

FIG. 5E illustrates yet another exemplary process for generating menu data based on the directory structure of the web site, in accordance with certain exemplary embodiments of the present invention. Static HTML web sites and web sites that use a publishing system may include a hierarchal directory-based system to organize individual web pages within the site. Sections and subsections of the site may be organized by using path names that include directory and subdirectory names separated by a slash ("/"). An example of such a directory structure extending through three directory levels can be as follows:

http://www.web site.com/
http://www. web site.com/SPORTS/
http://www. web site.com/WEATHER/
http://www. web site.com/NEWS/
http://www. web site.com/NEWS/local/
http://www. web site.com/NEWS/national/
http://www. web site.com/NEWS/international/

In the exemplary process for generating the menu data shown in FIG. 5E, the processor may receive the full URL for some or all pages within a certain web site (step 234A). The processor may then detect and identify the directory structure based on the URLs, optionally remove duplicate links or subdirectories, and order the URLs in a sorted list (step 234B). Each item in the sorted list may represent a menu item, and the menu items can be ordered in a format similar to a directory tree. An example of a sorted directory tree can be as follows:

```
<DIV id=menuframe>
    <UL id=nav>
        <LI><A href=" http://www.website.com/about.HTML">About </A></LI>
        <LI><A href=" http://www.website.com/products.HTML">Products</A>
            <UL>
                <LI><A href=" http://www.website.com/consulting.HTML">Consulting</A>
                </LI>
                <LI><A href=" http://www.website.com/statistics.HTML">Statistics</A></LI>
                <LI><A href="http://www.website.com/online_marketing.HTML">Online marketing</A></LI>
                <LI><A href=" http://www.website.com/virus.HTML">Virus protection</A>
                </LI>
            </UL>
        </LI>
        <LI><A href=" http://www.website.com/links.HTML">Links</A> </LI>
        <LI><A href=" http://www.website.com/sitemap.HTML">Sitemap</A> </LI>
    </UL>
</DIV>
```

```
Main menu
    SPORTS
    WEATHER
    NEWS
        local
        national
        international
```

The directory tree can then be converted into the menu data (step 234C). The first level directory can be used to generate top-level menu items, and the next level of the directory can be used to generate the next level of menu items, and so on, until the desired number of levels of the directory structure have been used to generate corresponding levels of menu items. If there is a large number of directory levels, the number of levels in the generated menu data may be truncated as described above. Optionally, menu data generated by using the directory structure as described above may be compared with and/or validated by menu data generated by any of the other processes described herein.

Figure 5F:
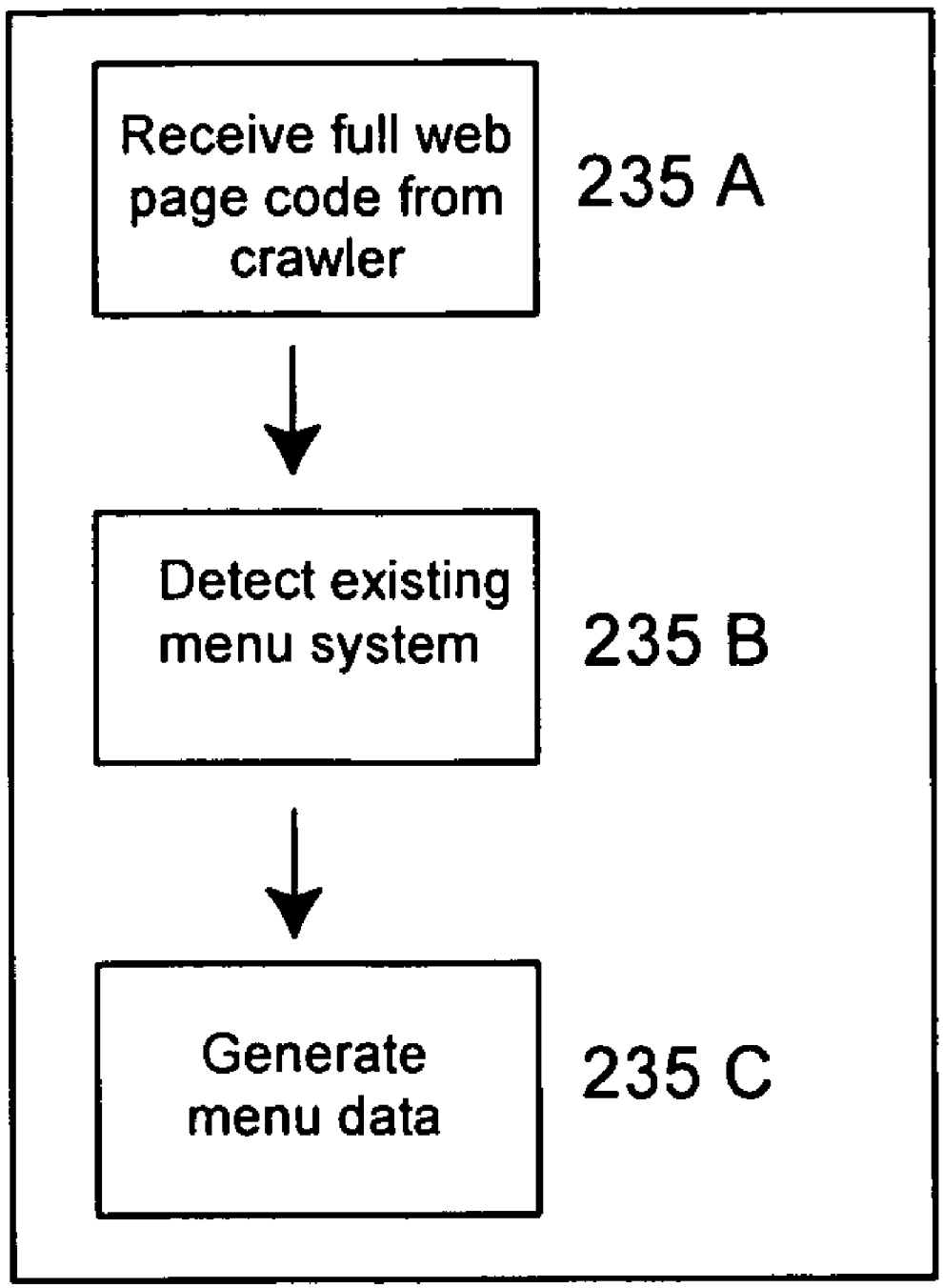
FIG. 5F is a flow diagram of a ninth exemplary embodiment of the method according to the present invention.

The menu data may be generated from an existing menu structure associated with a particular web site, if present. An example of such a process is shown in FIG. 5F. For example, a processor can receive full source code associated with a web site from the crawler (step 235A). The crawler may be configured to detect only the HTML code associated with the web pages, and to ignore scripts, tags and/or other specific elements to improve crawling efficiency. To detect an existing menu system, the full source code associated with the web site can be gathered by the crawler and provided to the processor. The processor may then detect an existing menu structure (step 235B) by detecting clusters of links, rows and columns of links in tables, bullet lists, Cascade Style Sheets that can format the link structure, javascript objects comprising links, etc., that may be contained within the provided source code. After detecting the menu structure, the processor may generate the corresponding menu data (step 235C).

An example of the navigational menus generated from the existing menu structures is shown in FIGS. 9A and 9B. The main menu of an exemplary web site is shown in FIG. 9A. This menu can be generated by the following exemplary source code through the use of a conventional stylesheet:

If a stylesheet was not used, the menu may be displayed as an ordinary bullet list, such as the exemplary sorted directory tree provided above. The submenus associated with the exemplary source code listed above are shown in FIG. 9B. These submenus may be generated using stylesheets, javascript, or by other conventional way of generating hierarchal menus.

Figure 10A:
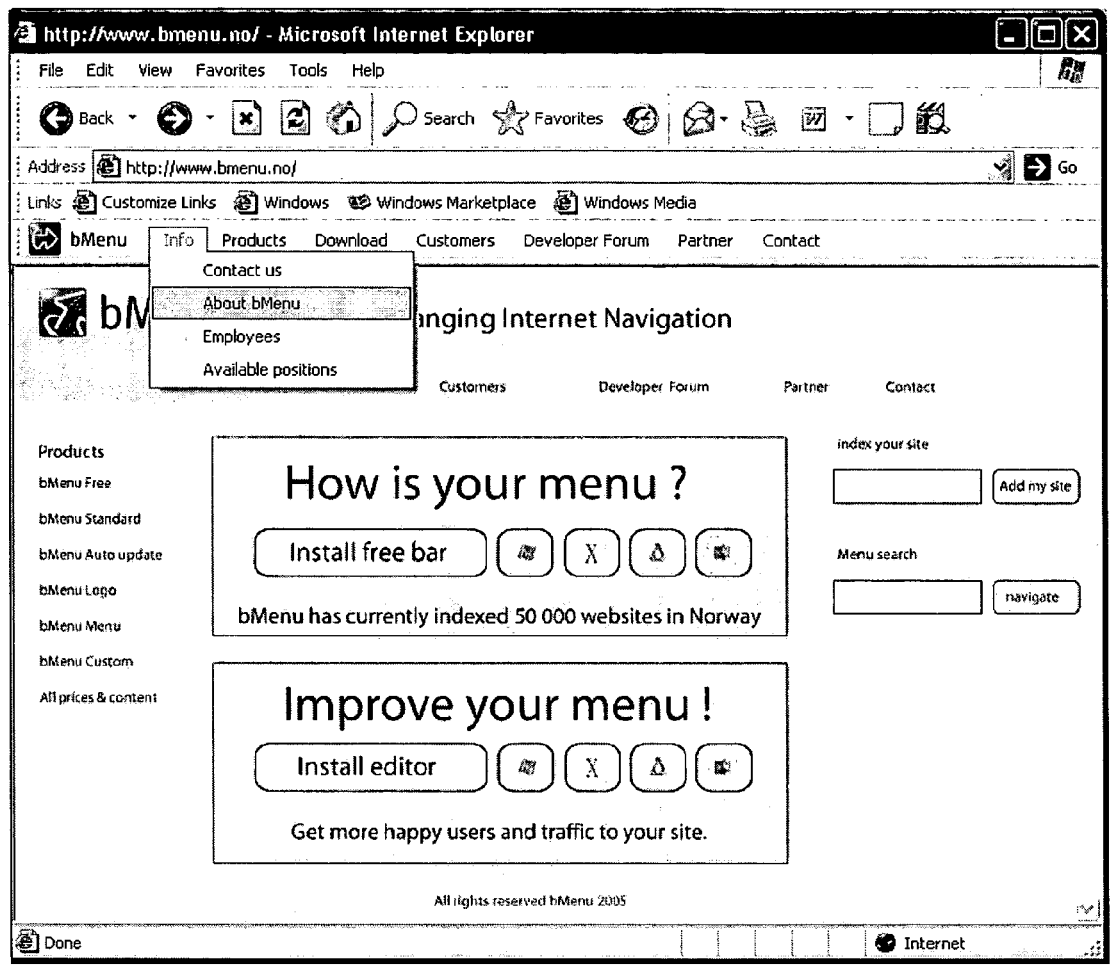
FIG. 10A is a screenshot of an exemplary web page showing the use of hierarchal navigational menus that can be used with the method, system, software arrangement and computer-accessible medium in accordance with an exemplary embodiment of the present invention.
Figure 10B:
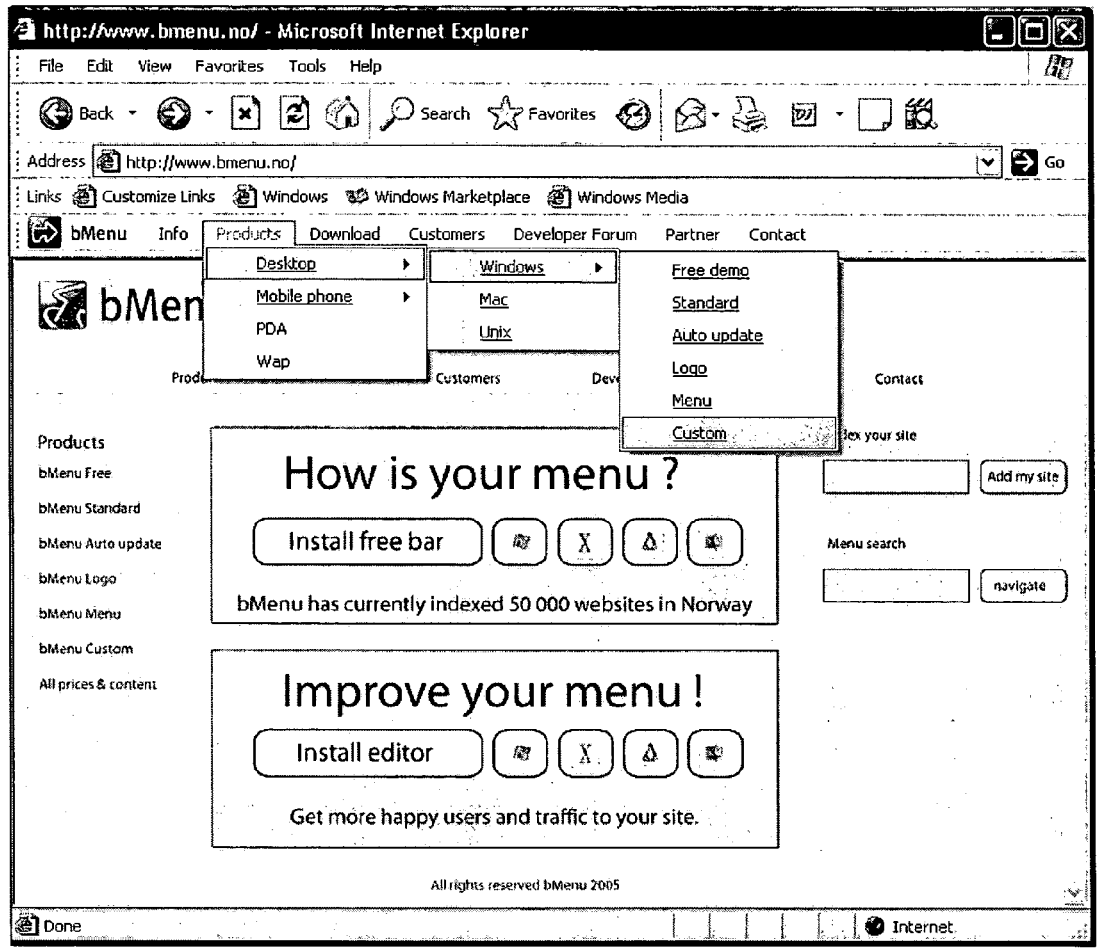
FIG. 10B is a screenshot of a second exemplary web page showing further use of hierarchal navigational menus that can be used with the method, system, software arrangement and computer-accessible medium in accordance with an exemplary embodiment of the present invention.

FIG. 10A shows an exemplary web site navigational menu that may be generated and displayed according to certain exemplary embodiments of the present invention. Pre-slected top-level and/or sub-menu items may optionally be generated for web sites where a specific predefined content is detected. For example, an Info menu item can be automatically generated and associated with a link to a page containing certain content detected within a web site. By detecting the specific content or content having a predefined format on a web page within the web site, a standardized menu item can be generated which can link to the web page containing the specific content on any web site, if present. For example, a "Contact us" menu item may be provided for the web site, and linked to a web page containing contact information. To select the web page to link to from the "Contact us" menu item, variables such as the text "contact us," phone number formats, e-mail formats, and the like may be provided to a content detection module. The module may then identify the web page where these words and formats occur most frequently, and may link this page to the menu item named "Contact us" under the Info menu. This exemplary procedure may be repeated for each web site accessed by the client.

Other types of content may also be linked to predefined menu items in the generated menus, such as the "Employees" and "Available positions" menu items shown under the Info menu item, as shown in FIG. 10A. To increase the accuracy of detected content, each variable used to identify specific content can be assigned a weighting factor. The weighting factor may also be affected by the location of a detected variable on a web page (e.g., the weighting factor may be larger if the detected content is located at or near the top of a web page), by other links or text detected on the web page, and the like.

From the description of the exemplary embodiments of the present invention provided herein, together with the figures and appended claims, a number of advantages of the present invention may become evident:

a) providing a navigational menu in a consistent location associated with a browser or other client, a user can locate and access the menu easily, similar to the display of standard menus within a computer operating system;

b) using content detection methods described above, standard menu items can be generated that may link to specific types of content on various web sites, such as contact information;

c) a standard menu interface can provide a common layout and design for navigation of any web site browsed by the user;

d) a standard menu interface can allow a user to vary the size and/or the appearance of text in menu labels to make them easier to read and to accommodate the user's preferences;

e) a multilevel or a hierarchal menu can allow the user to navigate the web site without having to browse or load the web pages that may intervene in the link structure of the web site f) a multilevel or hierarchal menu can permit the user to navigate directly to a specific page of the web site, and to view the various pages available within a web site without loading them;

g) a multilevel or hierarchal menu can be provided on any web page within the web site, and allow direct navigation to any other page within the web site;

h) server-based translation of a multilevel or hierarchal menu can allow the user to choose the language of the menu labels associated with the web site, and to identify certain types of content on the web site in the desired language;

i) a multilevel or hierarchal menu can be generated and stored on a server independently from the web site, likely resulting in no implementation or generation thereof on the web site;

j) a multilevel or hierarchal menu interface can provide easy navigation on small-screen devices such as PDA's or mobile phones; and k) a multilevel or hierarchal menu interface can provide easy navigation of web content on TV-based web browsers.

Having thus described in detail several exemplary embodiments of the present invention, it is to be understood that the invention described above is not to be limited to particular details set forth in the above description, as many apparent variations thereof are possible without departing from the spirit or scope of the present invention. The embodiments of the present invention are disclosed herein or are obvious from and encompassed by the detailed description. The detailed description, given by way of example, but not intended to limit the invention solely to the specific embodiments described, may best be understood in conjunction with the accompanying Figures.

The foregoing applications, and all publications or documents cited therein or during their prosecution ("appln. cited documents") and all publications or documents cited or referenced in the appln. cited documents, and all publications or documents cited or referenced herein ("herein cited documents"), and all publications or documents cited or referenced in the herein cited documents, together with any manufacturer's instructions, descriptions, product specifications, or product sheets for any products mentioned herein or in any document incorporated by reference herein, are hereby incorporated herein by reference, and may be employed in the practice of the present invention. Citation or identification of any document in this application is not an admission that such document is available as prior art to the present invention.

It is noted that in this disclosure and particularly in the claims, terms such as "comprises," "comprised," "comprising" and the like can have the meaning attributed to them in U.S. Patent law; e.g., they can mean "includes," "included," "including" and the like; and that terms such as "consisting essentially of" and "consists essentially of" can have the meaning ascribed to them in U.S. patent law, e.g., they may allow for elements not explicitly recited, but can exclude elements that are found in the prior art or that may affect a basic or novel characteristic of the invention.

What is claimed is:

1. A method for providing navigation of a web site, comprising:
    (a) receiving first information which is associated with the web site;
    (b) obtaining second information relating to a link structure of the web site; and
    (c) using a computing arrangement, providing third information for automatically generating a hierarchal structure as a function of the second information,
    wherein the second information is at least one of generated or obtained independently from one or more processors associated with the web site, wherein the hierarchal structure comprises a plurality of items.

2. The method of claim 1, wherein the first information is received from a database.

3. The method of claim 1, wherein the first information is received from a client.

4. The method of claim 3, wherein the client comprises a processor configured to execute a web browser software program.

5. The method of claim 3, wherein the client comprises a cellular telephone configured to access the Internet.

6. The method of claim 3, wherein the client comprises a television device, and wherein the client is configured to access the Internet.

7. The method of claim 3, further comprising displaying the hierarchal structure on a display arrangement of the client.

8. The method of claim 3, further comprising storing the third information in a storage arrangement associated with the client.

9. The method of claim 3, wherein step (b) further comprises obtaining the second information by at least one of retrieving the second information from a storage arrangement associated with the client or by accessing the web site.

10. The method of claim 1, wherein the second information is obtained by a further processing arrangement that is separate from the one or more processors associated with the web site.

11. The method of claim 1, wherein step (b) further comprises obtaining the second information by accessing the web site.

12. The method of claim 1, further comprising storing the second information on a first server that is separate from a second server controlling the web site.

13. The method of claim 1, further comprising removing at least one duplicate link from at least one of the second information or the third information.

14. The method of claim 1, further comprising removing all duplicate links from at least one of the second information or the third information.

15. The method of claim 1, further comprising removing at least part of at least one of the second information or the third information to provide a predetermined maximum number of the items in the hierarchal structure.

16. The method of claim 1, further comprising truncating the third information to provide a predetermined maximum number of levels of the items in the hierarchal structure.

17. The method of claim 1, further comprising truncating the third information to provide a predetermined maximum number of items in a top level of the hierarchal structure.

18. The method of claim 1, wherein each of the items comprises an identifier and a link to a web page within the web site.

19. The method of claim 18, wherein the hierarchal structure further comprises at least one preselected identifier, and wherein the link associated with this at least one preselected identifier is selectable based at least in part on the second information.

20. The method of claim 19, wherein the at least one preselected identifier comprises at least one of contact information, contact, contacts, contact us, employees, job openings, positions available, position openings.

21. The method of claim 18, further comprising converting at least one identifier into a selected language and displaying the at least one converted identifier on the client.

22. The method of claim 18, further comprising providing an ability to modify at least one of a font, a size, or a color of at least one identifier.

23. A system for providing navigation of a web site, comprising:
- a storage arrangement which provides thereon a set of instructions, which when executed by a processing arrangement, are configured to:
  - (a) receive first information which is associated with the web site;
  - (b) obtain second information relating to a link structure of the web site; and
  - (c) provide third information for automatically generating a hierarchal structure as a function of the second information,
  - wherein the second information is at least one of generated or obtained independently from one or more processors associated with the web site, wherein the hierarchal structure comprises a plurality of items.

24. An executable non-transitory storage arrangement for providing navigation of a web site, comprising:
- (a) a first set of instructions which is capable of enabling a processing arrangement to receive first information which is associated with the web site;
- (b) a second set of instructions which is capable of enabling a processing arrangement to obtain second information relating to a link structure of the web site; and
- (c) a third set of instructions which is capable of enabling a processing arrangement to provide third information for automatically generating a hierarchal structure as a function of the second information,
- wherein the second information is at least one of generated or obtained independently from one or more processors associated with the web site, wherein the hierarchal structure comprises a plurality of items.

25. A non-transitory computer-accessible medium comprising executable instructions for providing navigation of a web site, wherein, when the executable instructions are executed by a processing arrangement, the executable instructions perform the steps comprising:
- (a) receiving first information which is associated with the web site;
- (b) obtaining second information relating to a link structure of the web site; and
- (c) providing third information for automatically generating a hierarchal structure as a function of the second information,
- wherein the second information is at least one of generated or obtained independently from one or more processors associated with the web site, wherein the hierarchal structure comprises a plurality of items.

26. The method of claim 1, wherein the providing step further includes providing third information for generating a menu-based structure as a function of the second information, wherein the menu-based structure comprises a plurality of items.

27. The method of claim 1, wherein the hierarchal structure comprises more than one level.

* * * * *